(12) United States Patent
Noda et al.

(10) Patent No.: US 9,362,581 B2
(45) Date of Patent: Jun. 7, 2016

(54) METAL-AIR BATTERY SYSTEM INCLUDING CO2 SELECTIVE ABSORBER AND OPERATING METHOD THEREFOR

(71) Applicant: NGK Insulators, Ltd., Nagoya (JP)

(72) Inventors: Kenichi Noda, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 743 days.

(21) Appl. No.: 13/657,169

(22) Filed: Oct. 22, 2012

(65) Prior Publication Data

US 2013/0106359 A1   May 2, 2013

Related U.S. Application Data

(60) Provisional application No. 61/552,694, filed on Oct. 28, 2011.

(51) Int. Cl.
*H02J 7/00* (2006.01)
*H01M 8/06* (2016.01)
*H01M 12/08* (2006.01)

(52) U.S. Cl.
CPC .......... *H01M 8/0668* (2013.01); *H01M 8/0687* (2013.01); *H01M 12/08* (2013.01); *Y02E 60/50* (2013.01)

(58) Field of Classification Search
USPC ........................................................ 320/128
See application file for complete search history.

(56) References Cited

U.S. PATENT DOCUMENTS

| | | | | |
|---|---|---|---|---|
| 6,991,876 | B2* | 1/2006 | Narang et al. | 429/231.95 |
| 2008/0268327 | A1* | 10/2008 | Gordon et al. | 429/50 |
| 2010/0151336 | A1* | 6/2010 | Nakanishi | 429/407 |
| 2011/0059347 | A1* | 3/2011 | Lee et al. | 429/120 |
| 2011/0143173 | A1* | 6/2011 | Drews et al. | 429/50 |

FOREIGN PATENT DOCUMENTS

| | | |
|---|---|---|
| JP | 05-062687 A1 | 3/1993 |
| JP | 07-014565 A1 | 1/1995 |
| JP | 07-105991 A1 | 4/1995 |
| JP | 11-253736 A1 | 9/1999 |
| JP | 2002-516474 A1 | 6/2002 |
| JP | 2005-067991 A1 | 3/2005 |
| WO | 99/60654 A1 | 11/1999 |

* cited by examiner

*Primary Examiner* — Yalkew Fantu
(74) *Attorney, Agent, or Firm* — Burr & Brown, PLLC (57) ABSTRACT

A metal-air battery system includes: a metal-air battery including a case and a charge/discharge member arranged in the case and having a cathode, an anode and an electrolyte; a $CO_2$ absorbing member having a $CO_2$ selective absorber selectively absorbing $CO_2$ over $O_2$; an outside air supplying member supplying outside air to the $CO_2$ absorbing member; a purified air supplying member supplying purified air to the cathode, the purified air having undergone absorptive $CO_2$ removal by the $CO_2$ selective absorber; and a recycling mechanism recycling the $CO_2$ selective absorber.

14 Claims, 12 Drawing Sheets

METAL-AIR BATTERY SYSTEM INCLUDING CO2 SELECTIVE ABSORBER AND OPERATING METHOD THEREFOR

CROSS-REFERENCE TO RELATED APPLICATIONS

This application claims priority to U.S. Provisional Application No. 61/552,694 filed on Oct. 28, 2011. The entire disclosure of U.S. Provisional Application No. 61/552,694 is hereby incorporated herein by reference.

BACKGROUND OF THE INVENTION

1. Field of the Invention

The present invention relates to a metal-air battery system including a $CO_2$ selective absorber and to an operating method therefor.

2. Description of the Related Art

Metal-air batteries have been attracting attention as next-generation large capacity batteries to replace Li-ion batteries. However, metal-air batteries are problematic in that the cathode becomes clogged by a low-solubility compound generated by $CO_2$ contained in air during a discharge reaction. JP H05-062687A, JP H07-105991A or JP H07-014565A describes an oxygen permselective cathode that uses a membrane of a polymer such as fluororesin or polydimethylsiloxane to remove $CO_2$ contained in air, but it is difficult to sufficiently lower the $CO_2$ concentration with an oxygen permselective cathode that uses a polymer membrane.

JP 2002-516474A reports an air battery that has an oxygen concentrator. This air battery uses zeolite for oxygen concentration and not for $CO_2$ absorption. Moreover, although there is a description of a $CO_2$ absorber, because no recycling mechanism is provided, $CO_2$ reaches saturation and the adsorption member deteriorates, resulting in a problem in that only a certain amount of $CO_2$ can be absorbed.

Also, JP H11-253736A reports zeolite as a $CO_2$ absorber for process gas. However, due to the small Si/Al ratio, this zeolite is hydrophilic and preferentially adsorbs water vapor when used in air, and thus the $CO_2$ adsorption performance is insufficient.

SUMMARY OF THE INVENTION

Accordingly, an object of the present invention is to provide a metal-air battery system that includes a $CO_2$ selective absorber that allows $O_2$ permeation, suppresses $CO_2$ permeation and sufficiently adsorbs $CO_2$, and a recycling mechanism therefor and that can stably use $CO_2$-removed air for discharge of a metal-air battery, and also to provide an operating method.

The metal-air battery system of the present invention includes: a metal-air battery including a case and a charge/discharge member arranged in the case and having a cathode, an anode and an electrolyte; a $CO_2$ absorbing member having a $CO_2$ selective absorber selectively absorbing $CO_2$ over $O_2$; an outside air supplying member supplying outside air to the $CO_2$ absorbing member; a purified air supplying member supplying purified air to the cathode, the purified air having undergone absorptive $CO_2$ removal by the $CO_2$ selective absorber; and a recycling mechanism recycling the $CO_2$ selective absorber.

Preferably, the outside air supplying member may have an outside air shutoff mechanism cutting off contact the $CO_2$ selective absorber with the outside air upon neither discharging nor recycling of the $CO_2$ selective absorber.

Preferably, the purified air supplying member may have a purified air shutoff mechanism cutting off contact the cathode with the purified air upon recycling of the $CO_2$ selective absorber.

It is preferable that the $CO_2$ selective absorber contains a mesoporous material and/or zeolite.

Moreover, the method for operating a metal-air battery system of the present invention is a method for operating the foregoing metal-air battery system and includes a discharging step of discharging electricity by supplying air to the cathode, the air having undergone absorptive $CO_2$ removal by the $CO_2$ selective absorber; and a recycling step of recycling the $CO_2$ selective absorber.

Preferably, the method for operating a metal-air battery system of the present invention may further include a charging step of charging the metal-air battery. The recycling step may be carried out during the charging step.

Preferably, the method may include a pause step of cutting off contact the $CO_2$ selective absorber with outside air upon neither discharging electricity nor recycling of the $CO_2$ selective absorber.

Moreover, it is preferable that the cathode does not contact with the purified air upon recycling of the $CO_2$ selective absorber in the recycling step.

According to the present invention, it is possible to provide a metal-air battery system that can stably use air from which $CO_2$ has been removed for discharge of a metal-air battery, and an operating method therefor.

DETAILED DESCRIPTION OF THE INVENTION

[Metal-Air Battery System]

The metal-air battery system of the present invention includes a metal-air battery provided with a case and a charge/discharge member that is arranged in the case and that has a cathode, an anode, and an electrolyte, a $CO_2$ absorbing member having a $CO_2$ selective absorber that selectively absorbs $CO_2$ over $O_2$, an outside air supplying member that supplies outside air to the $CO_2$ absorbing member, a purified air supplying member that supplies purified air that has undergone absorptive $CO_2$ removal by the $CO_2$ selective absorber to the cathode, and a recycling mechanism that recycles the $CO_2$ selective absorber.

<Metal-Air Battery>

The metal-air battery included in the metal-air battery system of the present invention is provided with a case and a charge/discharge member that is arranged in the case and that has a cathode, an anode, and an electrolyte. The case has an air hole, and air is introduced into the metal-air battery through the air hole. The metal-air battery may have an intermediate layer such as diffusion paper or a water repelling membrane between the cathode and the portion having the air hole of the case. The cathode is not particularly limited as long as it is conductive and porous and suppresses leakage and volatilization of an electrolytic solution, and examples include porous carbon and the like. Examples of anode materials include zinc, aluminum, magnesium, lithium, and the like. In particular, a lithium-air battery that uses lithium as an anode material is preferable because the potential difference between the anode and the cathode (positive electrode) is increased. An electrolytic solution containing a salt of the anode material is used for the electrolytic solution, and examples usable in lithium-air batteries include organic electrolytic solutions containing a lithium salt, aqueous electrolytic solutions containing lithium ions, and the like.

<$CO_2$ Absorbing Member>

The $CO_2$ absorbing member included in the metal-air battery system of the present invention has a $CO_2$ selective absorber that selectively absorbs $CO_2$ over $O_2$. Note that, herein, the term "to absorb" encompasses the term "to adsorb", and the phrase "that selectively absorbs $CO_2$ over $O_2$" means that the molar amount of $CO_2$ absorbed is at least 3 times and preferably at least 5 times greater than the molar amount of $O_2$ absorbed.

The $CO_2$ absorbing member may be provided outside the metal-air battery or may be provided inside the case. When provided inside the case, the $CO_2$ absorbing member can be provided upstream of the outside air supplied side of the cathode. In this case, the $CO_2$ absorbing member may be provided so as to be in contact with the cathode, or may be provided such that space or the intermediate layer is disposed between the $CO_2$ absorbing member and the cathode. The $CO_2$ absorbing member may be provided at one location or two or more locations. When multiple $CO_2$ absorbing members are provided at two or more locations, a $CO_2$ absorbing member in use may be switched between the $CO_2$ absorbing members.

<$CO_2$ Selective Absorber>

For the $CO_2$ selective absorber that selectively absorbs $CO_2$ over $O_2$, an inorganic material having an inorganic framework, an ionic liquid, an alkaline liquid, or the like is usable, and in particular, an inorganic material or an ionic liquid is preferably used.

Specifically, it is preferable that the inorganic material contains a mesoporous material or zeolite. Examples of the ionic liquid include imidazolium salt-based ionic liquids, pyridinium salt-based ionic liquids, phosphonium-based ionic liquids, and the like. Those that are prepared by modifying such ionic liquids with an amino group or the like may be also used. Examples of the alkaline fluid include amine solutions, alkali metal-containing solutions, alkaline earth metal-containing solutions, and the like.

When a substance that undergoes a chemical reaction with $CO_2$, such as calcium oxide or lithium hydroxide, and generates carbonate is used for the $CO_2$ selective absorber, relatively high temperatures may be needed in some cases to recycle the $CO_2$ selective absorber.

A material having a pore diameter of 1 nm to 100 nm is usable for the mesoporous material. The type of mesoporous material is not particularly limited, and specific examples include silica, alumina, carbon, and the like. Regarding the mesoporous material, pores may be modified by an amino group, an alkali metal, an alkaline earth metal, or the like. A natural and/or synthetic zeolite product may be used, and the type is not particularly limited. Specific examples include MFI-type zeolite, A-type zeolite, β-type zeolite, X-type zeolite, Y-type zeolite, USY, mordenite, DDR-type zeolite, and the like. An alkali metal or an alkaline earth metal may be contained in zeolite, and a preferable type of alkali metal or alkaline earth metal can be suitably used. Regarding the mesoporous material and zeolite, it is preferable that at least one of the materials listed above is used for an adsorbent, and two or more may be used in combination.

The content of the aforementioned mesoporous material and zeolite in the $CO_2$ selective absorber can be, for example, 50 wt % or greater, preferably 60 wt % or greater, and more preferably 70 wt % or greater. The content in this case refers to the content relative to the weight excluding a support.

For the aforementioned zeolite of the $CO_2$ selective absorber, zeolite having an Si/Al ratio of 10 or greater is preferable, and in particular, zeolite having an Si/Al ratio of 100 or greater (for example, 100 to 1000) is preferable. With an Si/Al ratio of 10 or greater and more preferably 100 or greater, zeolite can exhibit increased hydrophobicity, and the problem in that when used as an adsorbent in air, zeolite preferentially adsorbs water vapor and is likely to demonstrate lowered $CO_2$ adsorption performance barely occurs. Accordingly, use of zeolite having an Si/Al ratio of 10 or less such as X-type zeolite in some cases results in a problem in that $CO_2$ adsorption performance is likely to deteriorate due to water vapor adsorption.

Moreover, it is preferable that zeolite has an 8-membered ring structure. Having an 8-membered ring structure, zeolite exhibits increased $O_2$ permselectivity and can more selectively absorb $CO_2$ than $O_2$. Specifically, for example, DDR-type zeolite or the like is particularly preferable for zeolite having an 8-membered ring structure. DDR-type zeolite has an Si/Al ratio of 100 or greater, and can be synthesized according to a known method described in, for example, JP 2005-67991A.

Moreover, in addition to zeolite that contains "Si, Al, O" or "Si, O" as principal constituent elements, zeolite that contains "Al, P, O" or "Al, P, Si, O" as principal constituent elements may be used. These zeolites may contain transition metal elements other than those described above.

The form of the $CO_2$ selective absorber is not particularly limited, and the $CO_2$ selective absorber can take, for example, a powder, grain, spherical, plate, membrane, sheet, film, rod, honeycomb, desiccant rotor, or similar form. Also, it can take a supported form. Such a $CO_2$ selective absorber can be produced according to known methods.

When the $CO_2$ selective absorber takes a supported form, the material of the support is preferably at least one selected from the group consisting of ceramics, carbon, and metals. Silica, titania, alumina, and zirconia are preferable ceramics. Stainless steel and aluminum alloy are preferable metals. The form of the support is not particularly limited, and for example, the support preferably takes a plate, membrane, sheet, film, rod, honeycomb, desiccant rotor, or similar form.

A specific example of the $CO_2$ selective absorber is, for example, a zeolite membrane. In order to make a thin zeolite membrane while maintaining such mechanical strength that the membrane can withstand practical use, it is preferable to form a membrane on a support. Ceramics composed of, for example, α-alumina, γ-alumina, zirconia, anodized alumina, porous glass, and the like, and sintered metals mainly composed of stainless steel and the like are widely used for the support. Selecting the form of the support makes it possible to produce the zeolite-containing $CO_2$ selective absorber in a variety of forms.

The $CO_2$ selective absorber may further have a layer that has water repellency (water repelling layer). Having a water repelling layer makes it possible to prevent water from penetrating inside. This makes it possible to prevent any effect of moisture contained in outside air.

The material of the water repelling layer is preferably fluororesin or the like. The water repelling layer may be installed on the gas introduced surface side of the $CO_2$ selective absorber, or may be installed between the $CO_2$ selective absorber and a porous substrate. Note that when the water repelling layer is installed on the gas introducing surface side of the $CO_2$ selective absorber, the gas introduced surface is not exposed to the outside. However, the gas introduction surface may be exposed to the outside or need not be exposed to the outside. The water repelling layer preferably takes a plate, membrane, sheet, film, rod, or similar form. The thickness of the water repelling layer is not particularly limited as long as water can not permeate therethrough. The water repelling layer is preferably a porous water repelling layer.

When zeolite having an Si/Al ratio of 100 or greater, in particular, is used for the $CO_2$ selective absorber, the water repelling layer is not necessary in some cases because of the high hydrophobicity of the zeolite.

<Outside Air Supplying Member>

The outside air supplying member supplies outside air to the $CO_2$ absorbing member. The outside air supplying member is not particularly limited as long as outside air can be supplied to the $CO_2$ absorbing member, and examples include an air hole, a flow channel, and the like. A known pipe or the like can be used for the flow channel. Herein, the term "to supply" encompasses, in addition to supplying by a compressor, a fan, or the like, introducing by spontaneous diffusion or the like. It is preferable that outside air is supplied at about room temperature, but outside air may be introduced after being suitably heated or cooled as necessary. Also, it is preferable that outside air is supplied at about atmospheric pressure, but outside air may be introduced after being suitably pressurized as necessary.

The outside air supplying member may have an outside air shutoff mechanism that cuts off contact between the $CO_2$ selective absorber and outside air when neither discharging nor recycling of the $CO_2$ selective absorber is carried out. The outside air shutoff mechanism can block a supply of outside air to the $CO_2$ absorbing member as necessary. The outside air shutoff mechanism is not particularly limited as long as the flow of outside air in the outside air supplying member can be blocked, and a known fluid control mechanism such as an electromagnetic valve can be used. Here the phrase "neither discharging nor recycling is carried out" refers to a pause state in which the metal-air battery is not used. Blocking a supply of outside air to the $CO_2$ absorbing member can prevent excessive adsorption of $CO_2$ on the $CO_2$ absorbing member.

<Purified Air Supplying Member>

The purified air supplying member included in the metal-air battery system of the present invention supplies purified air that has undergone absorptive $CO_2$ removal by the $CO_2$ selective absorber to the cathode. Here the term "to supply" is as defined above. The purified air supplying member is not particularly limited as long as purified air can be supplied to the cathode, and examples include an air hole, a flow channel, and the like. A known pipe or the like can be used for the flow channel. Regarding the phrase "undergone absorptive $CO_2$ removal", part of $CO_2$ contained in outside air may be removed by absorption or adsorption, and preferably 50 vol % or greater, more preferably 70 vol % or greater, even more preferably 80 vol % or greater, and particularly preferably 90 vol % or greater of $CO_2$ contained in outside air may be removed. Purified air that has undergone absorptive $CO_2$ removal by the $CO_2$ selective absorber passes through the purified air supplying member and reaches the cathode.

The purified air supplying member may have a purified air shutoff mechanism that cuts off contact between the cathode and the purified air. The purified air shutoff mechanism is not particularly limited as long as the flow of purified air in the purified air supplying member can be blocked, and a known fluid control mechanism such as an electromagnetic valve can be used. It is preferable that the purified air shutoff mechanism can cut off contact between the cathode and the purified air when the $CO_2$ selective absorber is recycled. The purified air shutoff mechanism may be, for example, a mechanism that closes the flow channel between the cathode and the $CO_2$ selective absorber.

<Recycling Mechanism>

The metal-air battery system of the present invention has a recycling mechanism that recycles the $CO_2$ selective absorber. Here, the term "to recycle" can be defined such that 70 mol % or greater, preferably 80 mol % or greater, and more preferably 90 mol % or greater of absorbed $CO_2$ is removed. The recycling mechanism is not particularly limited as long as the $CO_2$ selective absorber can be recycled, and for example, the $CO_2$ selective absorber can be recycled by being heated and/or subjected to a reduced pressure. Moreover, introduction of a recycling fluid into the $CO_2$ selective absorber allows removed $CO_2$ to be promptly discharged, and therefore, it is preferable that the recycling mechanism is provided with, for example, a recycling fluid supplying member. In this case, the recycling fluid can reach the $CO_2$ absorbing member through the recycling fluid supplying member. The recycling fluid supplying member is not particularly limited as long as the recycling fluid can be supplied to the $CO_2$ absorbing member, and examples include an air hole, a flow channel, and the like. A known pipe or the like can be used for the flow channel.

Examples of the recycling fluid include air, water vapor, $N_2$ gas, $O_2$ gas, and the like. Air is preferably used as the recycling fluid for its availability.

The recycling fluid supplying member may be provided with a recycling fluid introducing mechanism that controls a supply of the recycling fluid to the $CO_2$ absorbing member. The recycling fluid introducing mechanism is not particularly limited as long as it can send or block the flow of the fluid in the recycling fluid supplying member, and a known fluid control mechanism such as an electromagnetic valve can be used. The recycling fluid can be supplied to the $CO_2$ absorbing member by opening the recycling fluid introducing mechanism as appropriate. The recycling fluid that has passed through the $CO_2$ absorbing member can be discharged from the outside air supplying member. The recycling fluid may be introduced from the outside air supplying member and discharged from the recycling fluid supplying member.

When the $CO_2$ selective absorber is recycled by heating, the temperature of the $CO_2$ selective absorber can be, for example, 20 to 200° C. and preferably 30 to 100° C. Heating of the $CO_2$ selective absorber may be carried out by heating the recycling fluid or the support using a heating means such as a heater, and the $CO_2$ selective absorber or the support may be directly heated by microwaves or the like. Also, it is possible to use heat generated during the discharge, charge, and/or recycling of the metal-air battery system. Moreover, waste heat of the discharge gas discharged from a system such as an electric vehicle that uses the metal-air battery system of the present invention may be used.

FIGS. 1 to 7 show exemplary embodiments of the metal-air battery system of the present invention. In the figures, the same reference numerals represent the same components and descriptions in some cases may be omitted.

Figure 1:
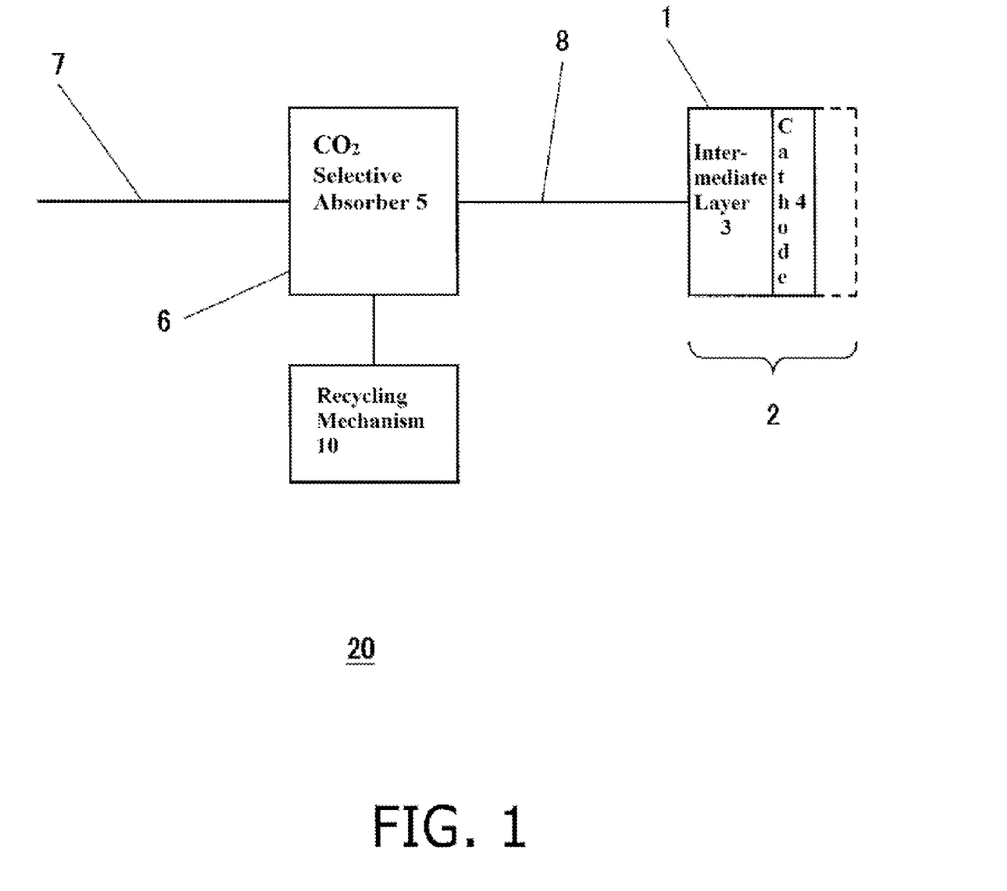
FIG. 1 is a schematic diagram showing an example of the configuration of a principal part of the metal-air battery system of the present invention.

In a metal-air battery system 20 shown in FIG. 1, reference numeral 1 represents a case and 2 represents a metal-air battery provided with a charge/discharge member (not shown) that is arranged in the case 1 and that has a cathode 4, an anode, and an electrolyte (not shown). The case 1 has an air hole (not shown), and air is introduced into the metal-air battery 2 through the hole. In the metal-air battery 2, an intermediate layer 3 such as diffusion paper or a water repelling membrane is provided between the cathode 4 and the portion having the air hole of the case 1. The intermediate layer 3 does not need to be provided. 5 represents a $CO_2$ selective absorber that is disposed in a $CO_2$ absorbing member 6. 7 represents an outside air supplying member that supplies outside air to the $CO_2$ absorbing member 6, and 8 represents a purified air supplying member that supplies purified air that has undergone absorptive $CO_2$ removal by the $CO_2$ selective absorber 5 to the cathode 4. Moreover, 10 represents a recycling mechanism that recycles the $CO_2$ selective absorber 5.

Figure 2:
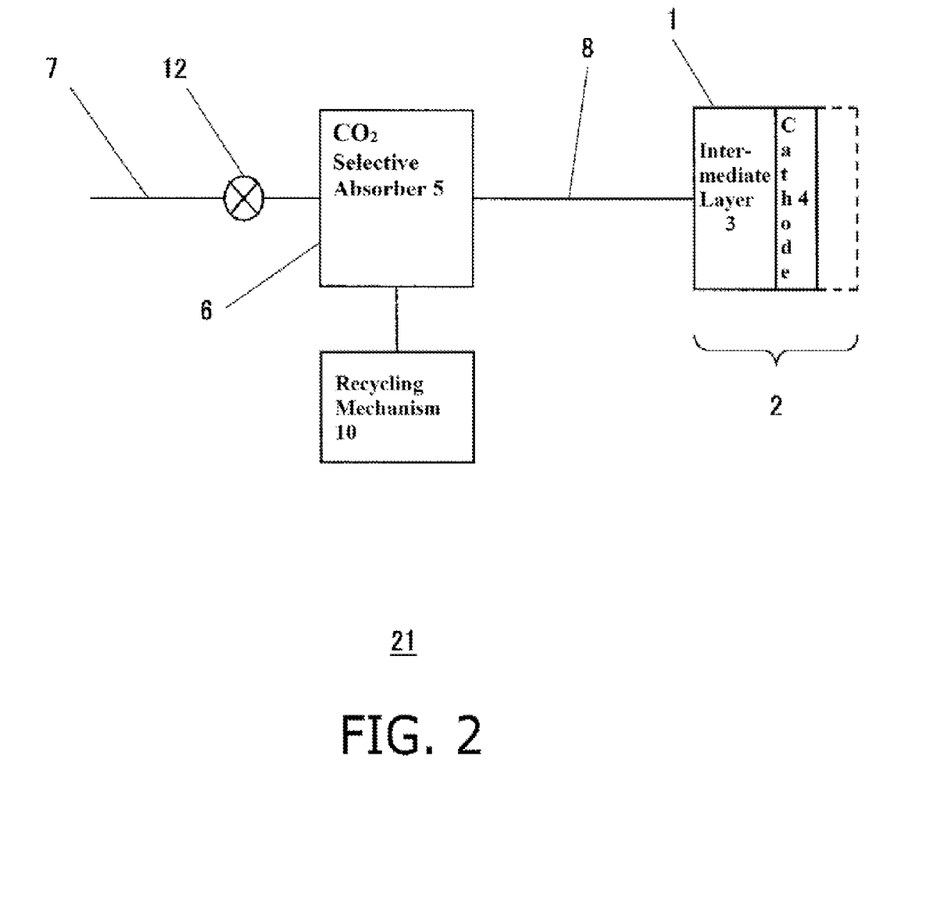
FIG. 2 is a schematic diagram showing another example of the configuration of a principal part of the metal-air battery system of the present invention.

In a metal-air battery system 21 shown in FIG. 2, 12 represents an outside air shutoff mechanism installed in the outside air supplying member 7. The outside air shutoff mechanism 12 can cut off contact between the $CO_2$ selective absorber 5 and outside air when neither discharge nor recycling of the $CO_2$ selective absorber 5 is carried out.

Figure 3:
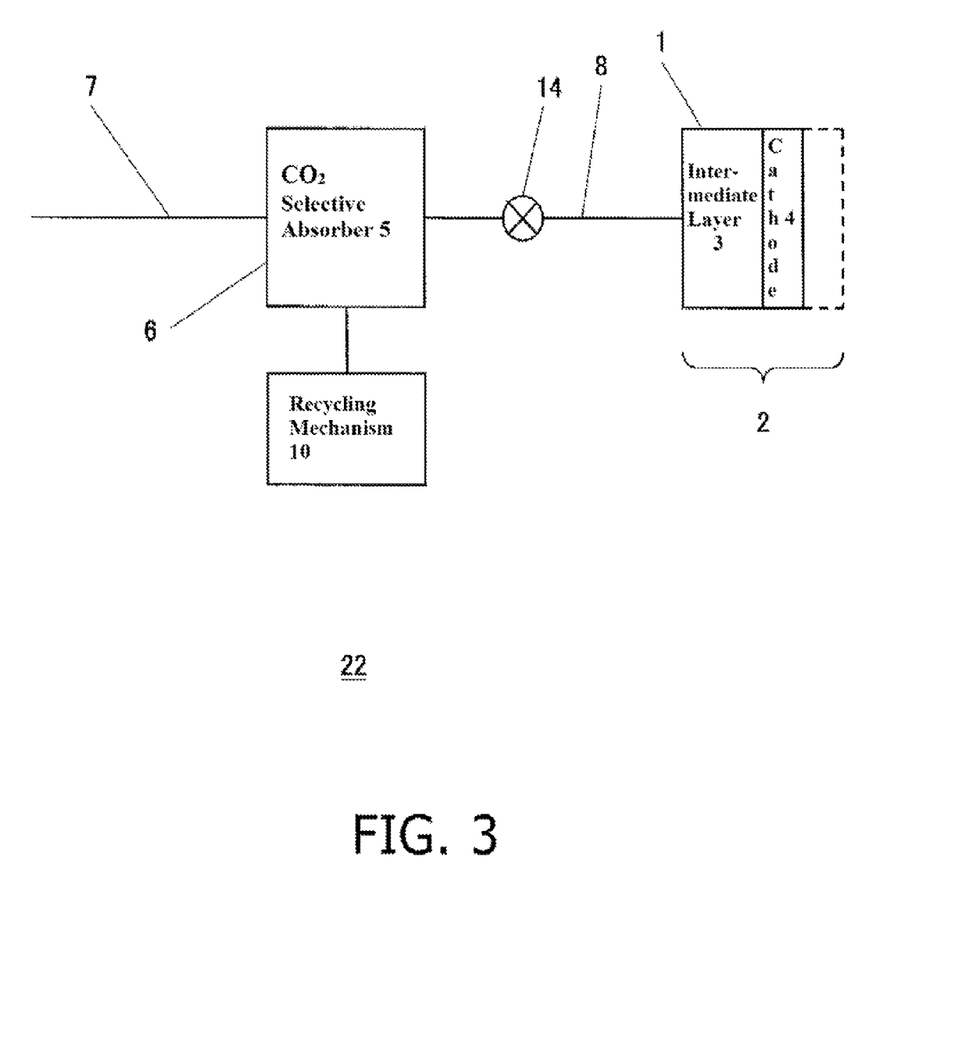
FIG. 3 is a schematic diagram showing another example of the configuration of a principal part of the metal-air battery system of the present invention.

In a metal-air battery system 22 shown in FIG. 3, 14 represents a purified air shutoff mechanism installed in the purified air supplying member 8. The purified air shutoff mechanism 14 can close the flow channel between the cathode 4 and the $CO_2$ selective absorber 5 when recycling of the $CO_2$ selective absorber 5 is carried out.

Figure 4:
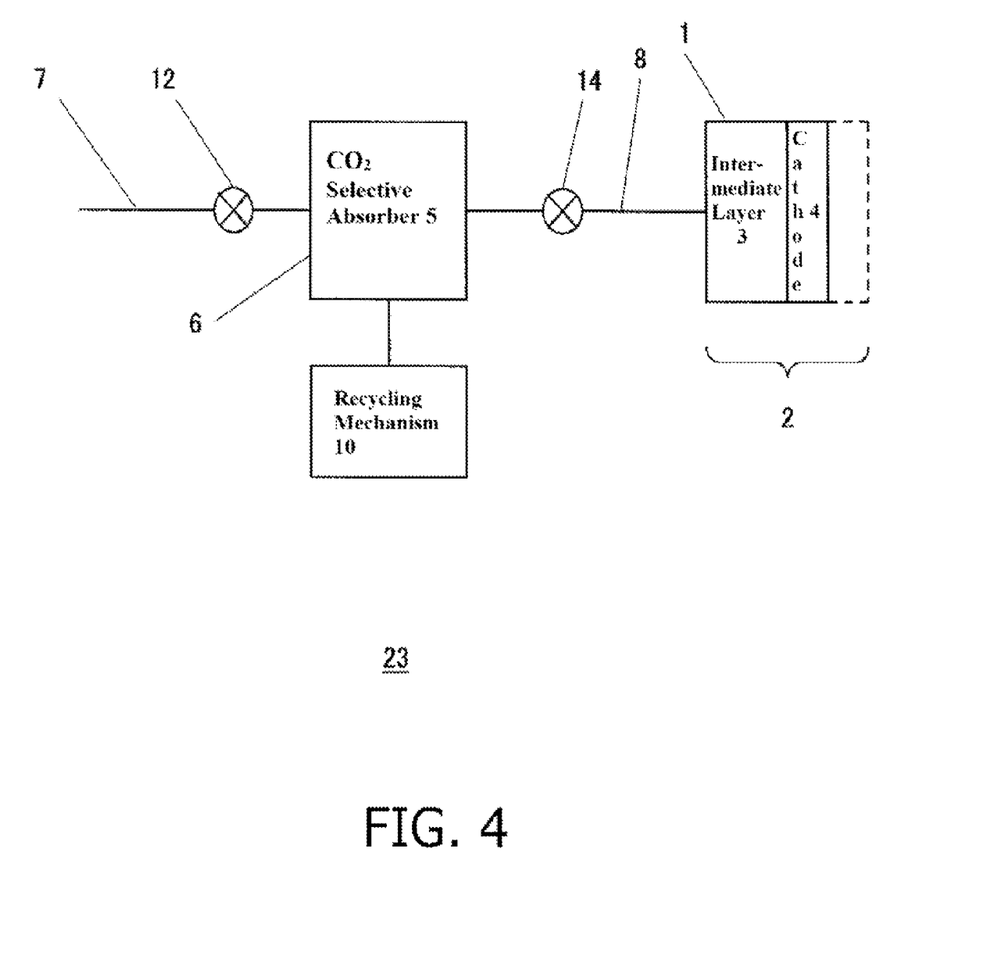
FIG. 4 is a schematic diagram showing another example of the configuration of a principal part of the metal-air battery system of the present invention.

A metal-air battery system 23 shown in FIG. 4 is provided with the outside air shutoff mechanism 12 installed in the outside air supplying member 7 and the purified air shutoff mechanism 14 installed in the purified air supplying member 8. Accordingly, contact between the $CO_2$ selective absorber 5 and outside air can be cut off by the outside air shutoff mechanism 12 when neither discharging nor recycling of the $CO_2$ selective absorber 5 is carried out, and the flow channel between the cathode 4 and the $CO_2$ selective absorber 5 can be closed by the purified air shutoff mechanism 14 when recycling of the $CO_2$ selective absorber 5 is carried out.

Figure 5:
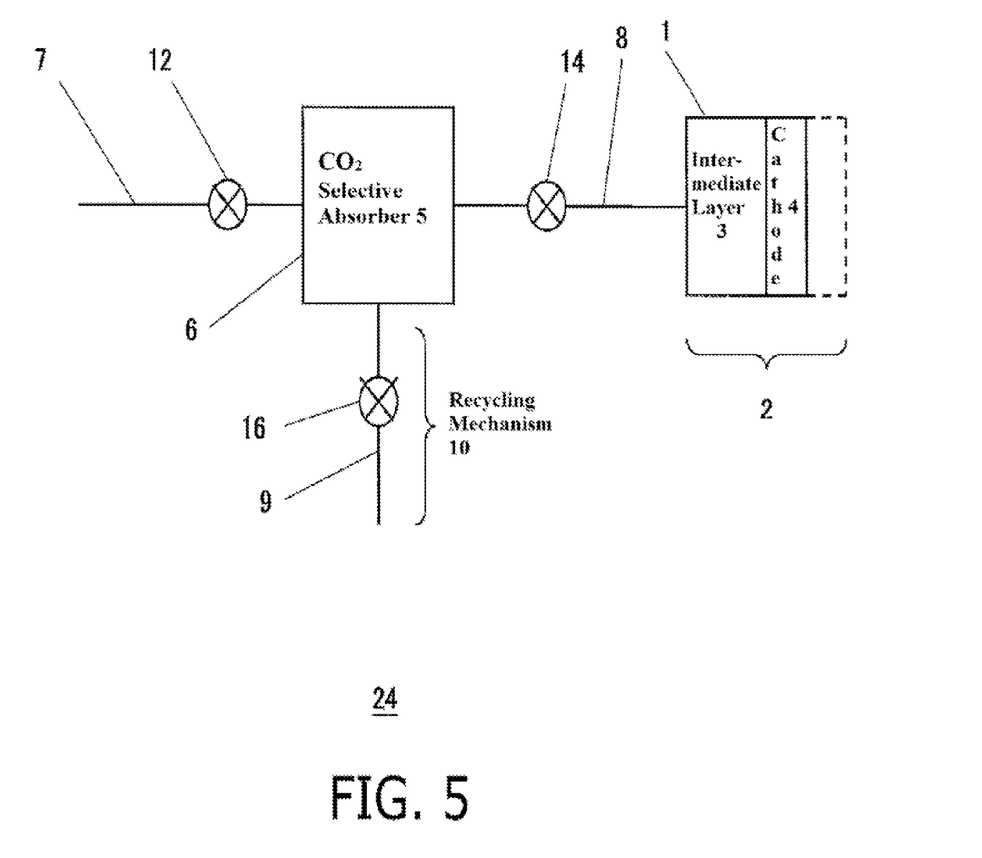
FIG. 5 is a schematic diagram showing another example of the configuration of a principal part of the metal-air battery system of the present invention.

In a metal-air battery system 24 shown in FIGS. 5, 16 and 9 represent a recycling fluid introducing mechanism and a recycling fluid supplying member, respectively, that constitute the recycling mechanism 10. In the metal-air battery system 24, the recycling fluid introducing mechanism 16 is opened to cause the recycling fluid supplying member 9 to be in communication with, and to introduce a recycling fluid into, the $CO_2$ selective absorber 5, thus making it possible to recycle the $CO_2$ selective absorber 5.

In exemplary embodiments of the metal-air battery system of the present invention, either the outside air shutoff mechanism 12 of the outside air supplying member 7 or the purified air shutoff mechanism 14 of the purified air supplying member 8, which are both provided as optional components, may be installed, or the mechanisms 12 and 14 may both be installed.

Figure 6:
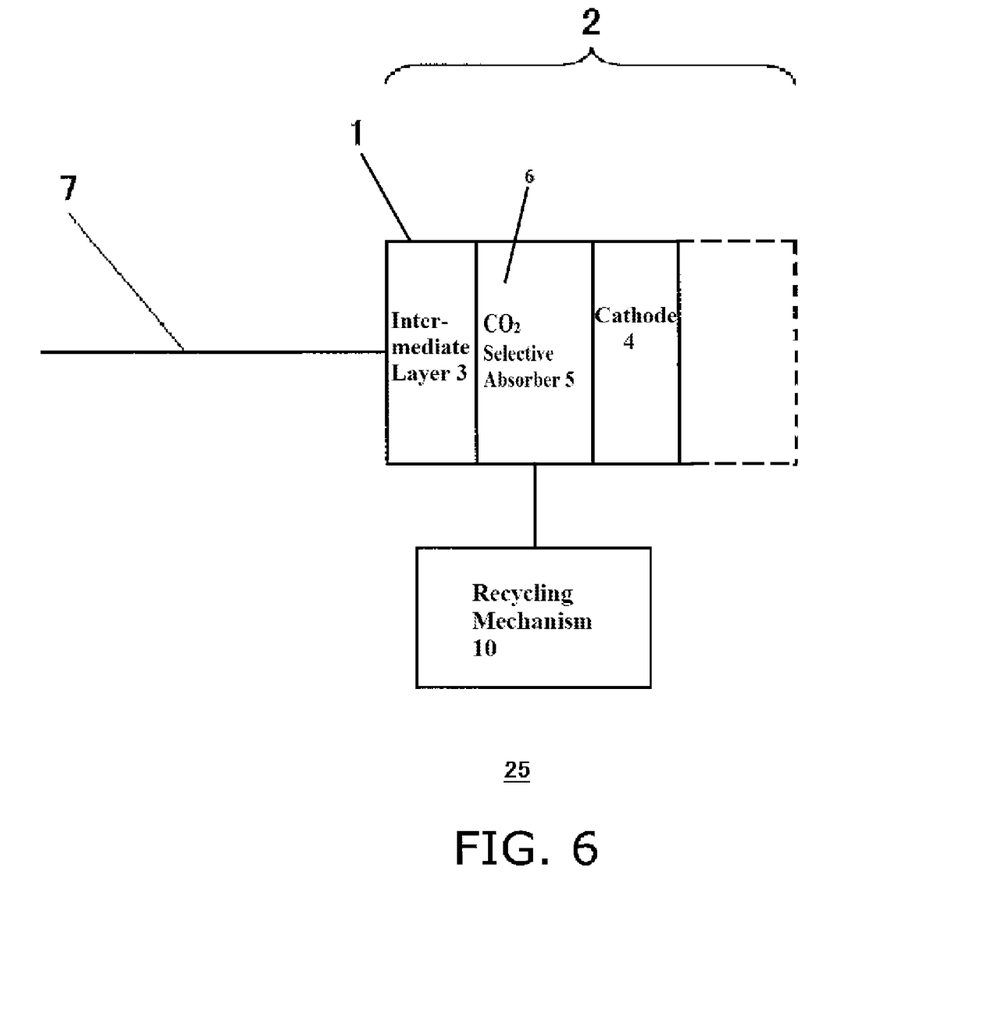
FIG. 6 is a schematic diagram showing another example of the configuration of a principal part of the metal-air battery system of the present invention.
Figure 7:
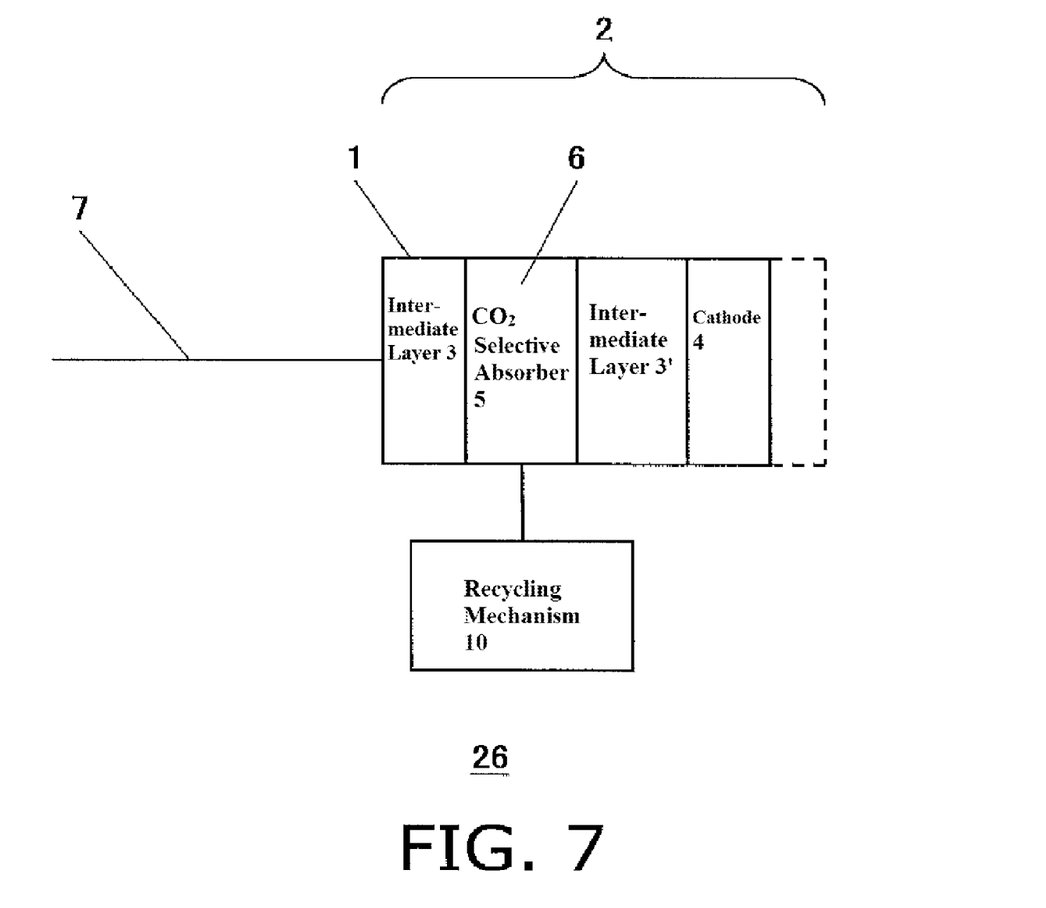
FIG. 7 is a schematic diagram showing another example of the configuration of a principal part of the metal-air battery system of the present invention.

In the metal-air battery system 25 shown in FIG. 6, the $CO_2$ selective absorber 5 is disposed so as to be in contact with the cathode 4 in the case 1. Moreover, as in a metal-air battery system 26 shown in FIG. 7, the $CO_2$ selective absorber 5 and the cathode 4 may be disposed in the case 1 with an intermediate layer 3' being interposed therebetween. The intermediate layer 3' may be the same as the intermediate layer 3 or it may be a space.

[Method For Operating Metal-Air Battery System]

The method for operating a metal-air battery system of the present invention is a method for operating the above-described metal-air battery system, and the method includes the discharging step of supplying air from which $CO_2$ has been absorbed by the $CO_2$ selective absorber to the cathode for discharging, and the recycling step of carrying out recycling treatment on the $CO_2$ selective absorber.

<Discharging Step>

In the discharging step included in the method for operating a metal-air battery system of the present invention, air from which $CO_2$ has been absorbed by the $CO_2$ selective absorber is supplied to the cathode for discharging. More specifically, for example, outside air is introduced into the $CO_2$ absorbing member from the outside air supplying member, then the air from which $CO_2$ has been absorptively removed by the $CO_2$ selective absorber is introduced into the cathode by the purified air supplying member, and thus discharge occurs. Because purified air from which $CO_2$, preferably 50 vol % or greater, more preferably 70 vol % or greater, even more preferably 80 vol % or greater, and particularly preferably 90 vol % or greater of $CO_2$ contained in outside air has been absorptively removed is supplied to the cathode, clogging of the cathode can be reduced.

<Recycling Step>

In the recycling step included in the method for operating a metal-air battery system of the present invention, recycling treatment is carried out on the $CO_2$ selective absorber. The recycling treatment method is not particularly limited as long as, for example, 70 mol % or greater, preferably 80 mol % or greater, and more preferably 90 mol % or greater of $CO_2$ that has been absorbed by the $CO_2$ selective absorber can be removed. For the recycling step, for example, the recycling fluid may be introduced into the $CO_2$ absorbing member through the recycling fluid supplying member, further passed through the $CO_2$ absorbing member, and discharged from the outside air supplying member. When the metal-air battery system has a recycling fluid introducing mechanism, opening the recycling fluid introducing mechanism as necessary makes it possible to supply the recycling fluid to the $CO_2$ absorbing member. The recycling fluid that has passed through the $CO_2$ absorbing member can be discharged from the outside air supplying member. Also, the recycling fluid may be introduced from the outside air supplying member and discharged from the recycling fluid supplying member. When the recycling of the $CO_2$ selective absorber is carried out in the recycling step, it is preferable to close the purified air shutoff mechanism of the purified air supplying member between the cathode and the $CO_2$ selective absorber.

<Charging Step>

The method for operating a metal-air battery system of the present invention may further include a charging step, and the recycling step may be carried out during the charging step. In the charging step, the metal-air battery is charged. The charging method is not particularly limited, and a known method can be used. Note that, in the charging step, the recycling step may always be carried out, or carried out only when required.

<Pause Step>

The method for operating a metal-air battery system of the present invention may further include a pause step of cutting off contact between the $CO_2$ selective absorber and outside air when neither discharging nor recycling of the $CO_2$ selective absorber is carried out. The phrase "when neither discharging nor recycling of the $CO_2$ selective absorber is carried out" is as defined above. Inclusion of the pause step can prevent deterioration of the $CO_2$ selective absorber. Contact between the $CO_2$ selective absorber and outside air can be cut off by closing the outside air shutoff mechanism.

<Example of Batch-Wise Recycling>

An example of carrying out the recycling step during the charging step will now be described. In this case, the $CO_2$ selective absorber that has adsorbed (absorbed) $CO_2$ in the discharge step is recycled in the recycling step during the charging step. Specifically, in the case where the $CO_2$ selective absorber is composed of zeolite that is supported on a support in the form of a honeycomb, in the discharging step, (1) when $CO_2$-containing outside air passes through the honeycomb, (2) zeolite selectively adsorbs (absorbs) $CO_2$ over $O_2$, and (3) air from which $CO_2$ has been removed is generated. Next, the recycling step is carried out simultaneously with the charging step, where (1) the recycling fluid is passed through the honeycomb, (2) the recycling fluid, after being heated as required, is send to the honeycomb in order to remove $CO_2$ adsorbed on (absorbed in) zeolite, and (3) the recycling fluid desorbs $CO_2$ from zeolite and is discharged. The zeolite-supported honeycomb from which $CO_2$ has been desorbed is again subjected to outside air in the discharging step and adsorbs (absorbs) $CO_2$.

<Example of Continuous Recycling>

In the method for operating a metal-air battery system of the present invention, it is possible that, for example, the recycling step is carried out during the discharging step to continuously recycle the $CO_2$ selective absorber. Specifically, for example, in the case where the $CO_2$ selective absorber is in the form of a desiccant rotor, on the $CO_2$ selective absorption side ($CO_2$ adsorption side), (1) $CO_2$-containing outside air is passed through a part of the desiccant rotor, (2) $CO_2$ contained in the outside air is adsorbed on (absorbed in) the desiccant rotor, and (3) the outside air that has passed through the desiccant rotor becomes $CO_2$-free air (purified air). In addition, on the recycling side ($CO_2$ desorption side) of the $CO_2$ selective absorber, (1) the recycling fluid is passed through a part of the desiccant rotor, (2) the recycling fluid, after being heated as required, is sent to the desiccant rotor in order to remove $CO_2$ that has been adsorbed on (absorbed in) the desiccant rotor, and (3) the recycling fluid desorbs $CO_2$ from the desiccant rotor and is discharged. The $CO_2$-desorbed desiccant rotor rotates, returns back to the $CO_2$ selective absorption side, and adsorbs (absorbs) $CO_2$. As described above, when the $CO_2$ selective absorber is in the form of a desiccant rotor, it is possible that $CO_2$ adsorption (absorption) is carried out in a part of the desiccant rotor while $CO_2$ desorption (recycling) is carried out in another part of the desiccant rotor.

Figure 8:
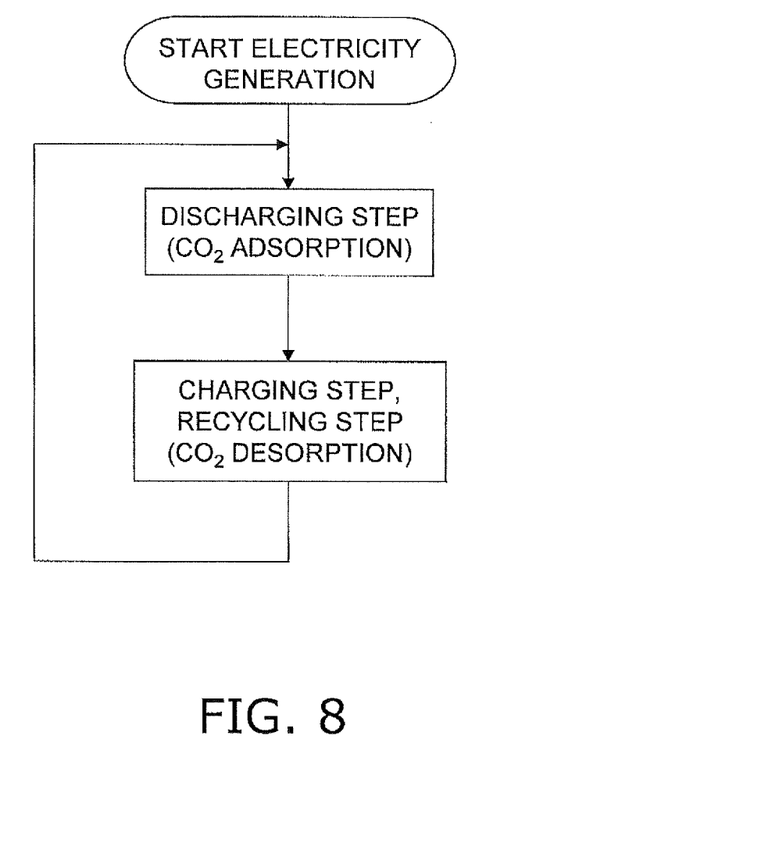
FIG. 8 is a flowchart showing an example of the method for operating a metal-air battery system of the present invention.
Figure 9:
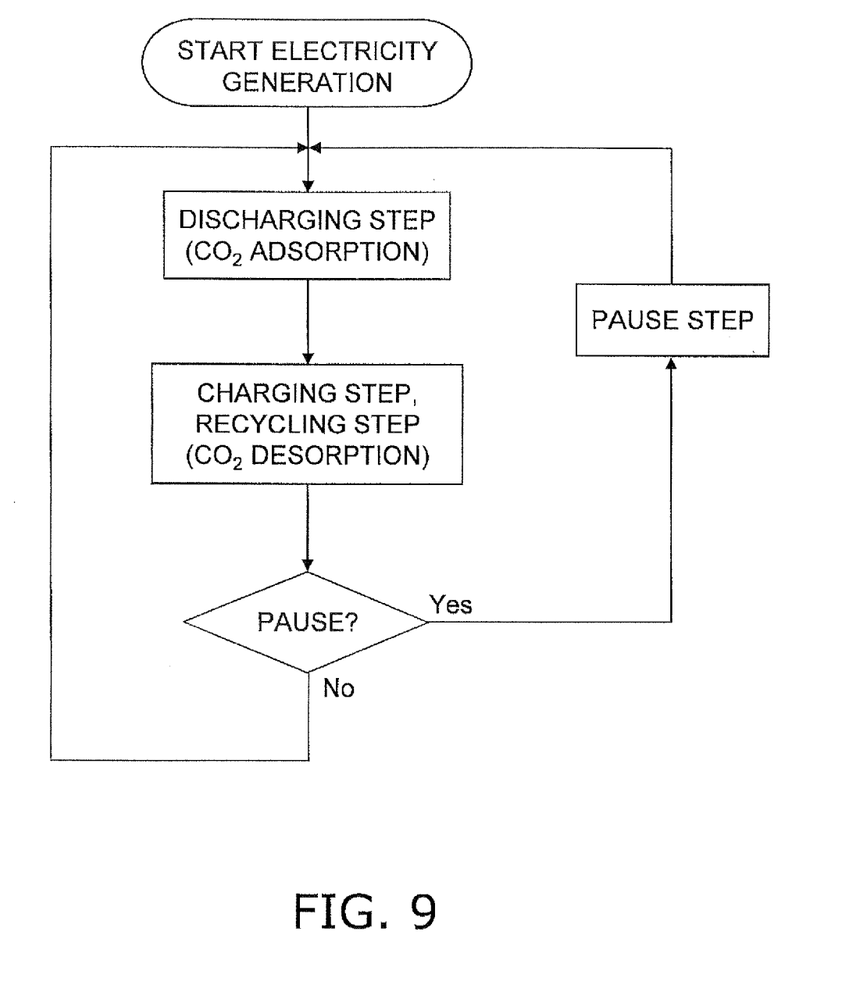
FIG. 9 is a flowchart showing another example of the method for operating a metal-air battery system of the present invention.

FIGS. 8 and 9 show exemplary embodiments of the method for operating a metal-air battery system of the present invention.

As shown in FIG. 8, in one example of the method for operating a metal-air battery system of the present invention, for example, introducing air from which $CO_2$ has been removed by the $CO_2$ selective absorber into the cathode from the air hole of the case causes discharging (discharging step). At this time, the $CO_2$ selective absorber adsorbs $CO_2$.

Next, charging is carried out (charging step), and recycling of the $CO_2$ selective absorber is carried out by the recycling mechanism during charging (recycling step). In the recycling step, the $CO_2$ selective absorber releases $CO_2$ and recovers its $CO_2$ adsorption performance. Thereafter, introducing air from which $CO_2$ has been removed by the $CO_2$ selective absorber into the cathode enables discharging (discharging step).

Also, in another example, as shown in FIG. 9, the pause step is further carried out when neither discharging nor recycling of the $CO_2$ selective absorber is carried out.

Figure 10:
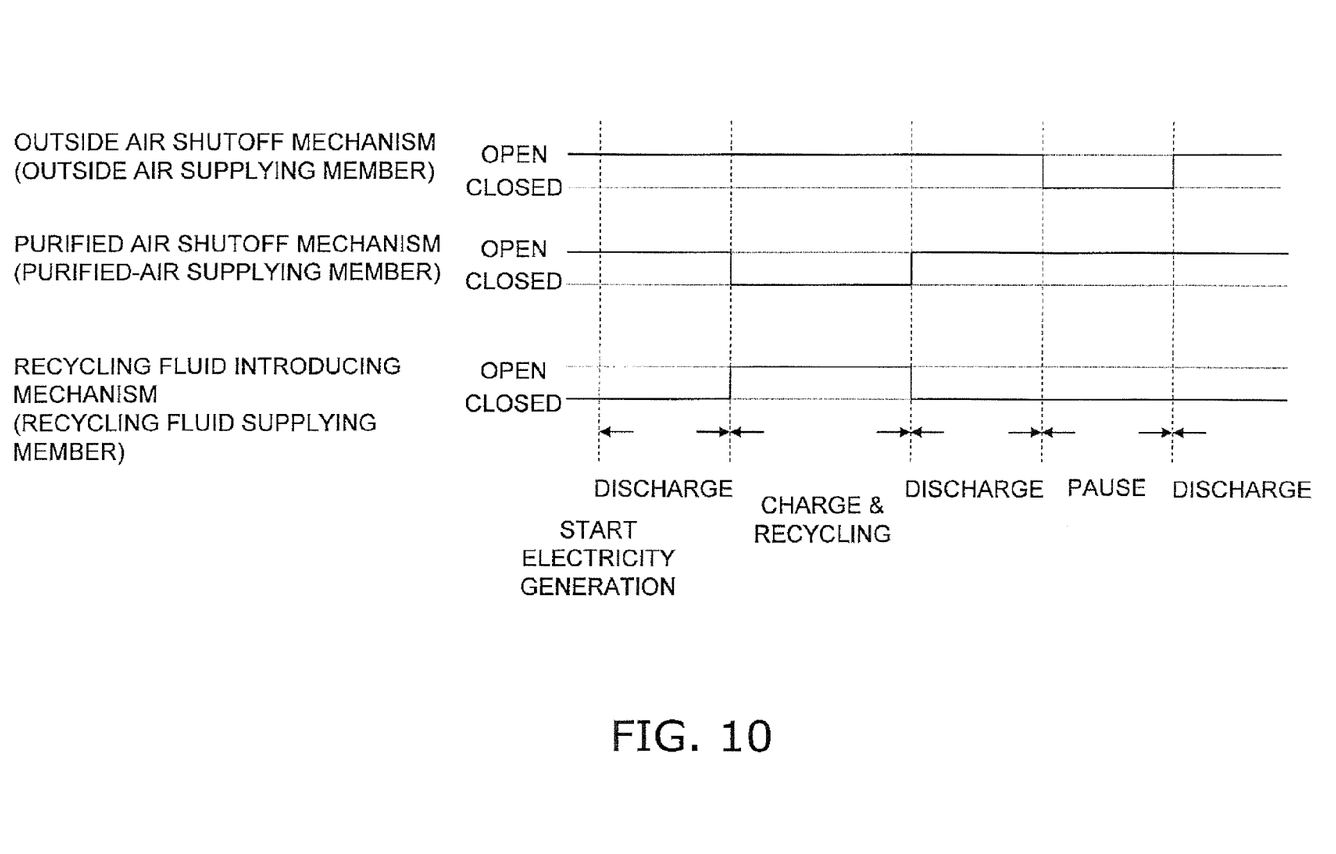
FIG. 10 is a diagram showing examples of open-close timings of an outside air shutoff mechanism, a purified air shutoff mechanism, and a recycling fluid introducing mechanism in one example of the method for operating a metal-air battery system of the present invention.
Figure 11:
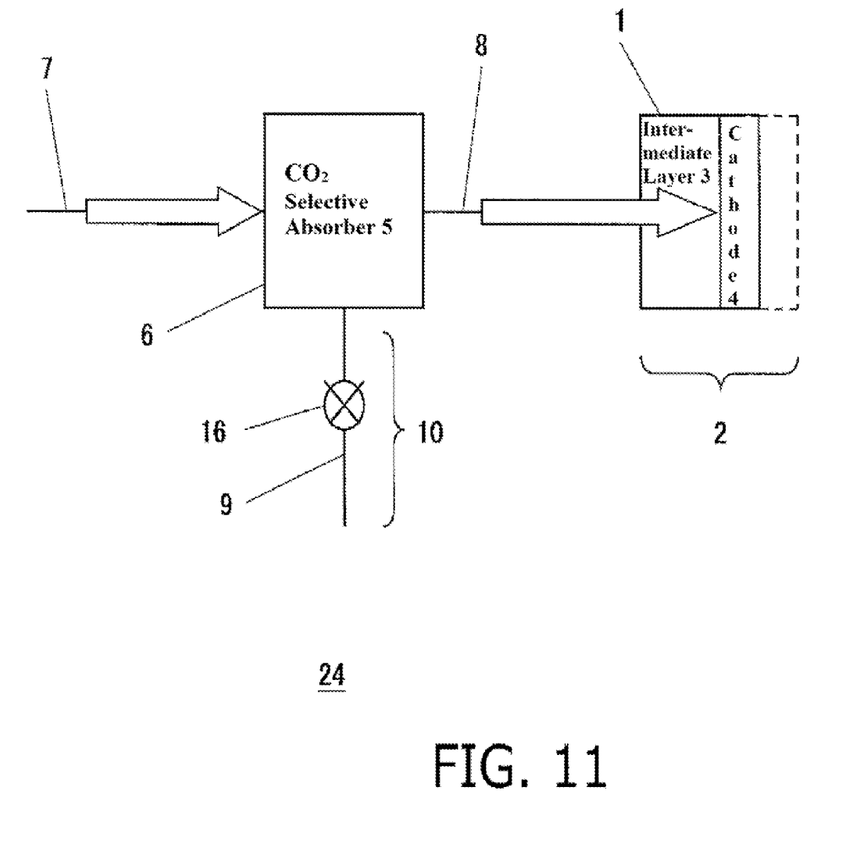
FIG. 11 is a diagram showing an example of the flow of outside air in the discharging step in one example of the method for operating a metal-air battery system of the present invention.

FIG. 10 shows open-close timings of the outside air shutoff mechanism 12, the purified air shutoff mechanism 14, and the recycling fluid introducing mechanism 16 in the metal-air battery system 24 shown in FIG. 5 as an example of the method for operating a metal-air battery system of the present invention. At the beginning of discharging, the outside air shutoff mechanism 12 of the outside air supplying member 7 and the purified air shutoff mechanism 14 of the purified air supplying member 8 are open, and the recycling fluid introducing mechanism 16 of the recycling fluid supplying member 9 is closed. Accordingly, outside air passes through the $CO_2$ absorbing member 6 via the outside air supplying member 7, $CO_2$ is absorptively removed by the $CO_2$ selective absorber 5, purified air reaches the cathode 4, and discharge occurs. The flow of outside air and purified air in this case is shown in FIG. 11. Outside air as indicated by a white arrow is introduced via the outside air supplying member 7 into the $CO_2$ absorbing member 6, becomes air from which $CO_2$ has been absorptively removed, passes through the purified air supplying member 8, and enters the case 1 from the air hole (not shown). In the case 1, the air passes through the intermediate layer 3 and reaches the cathode 4.

Figure 12:
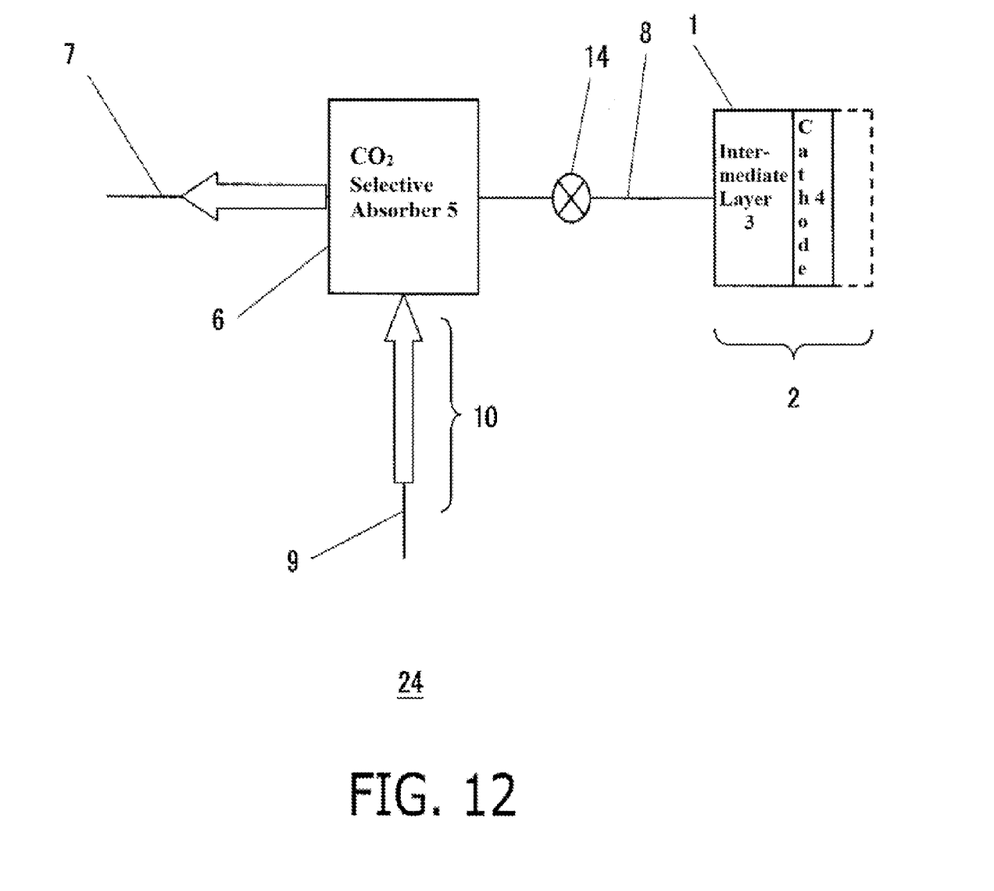
FIG. 12 is a diagram showing an example of the flow of recycling fluid in the recycling step in one example of the method for operating a metal-air battery system of the present invention.

Next, as shown in FIG. 10, the purified air shutoff mechanism 14 of the purified air supplying member 8 is closed, and the recycling fluid introducing mechanism 16 of the recycling fluid supplying member 9 is opened. At this time, the outside air shutoff mechanism 12 of the outside air supplying member 7 remains open. Then, the recycling fluid is introduced from the recycling fluid supplying member 9 into the $CO_2$ absorbing member 6. The flow of the recycling fluid in this case is shown in FIG. 12. The recycling fluid as indicated by white arrows is introduced via the recycling fluid supplying member 9 into the $CO_2$ absorbing member 6. Then, $CO_2$ absorbed in the $CO_2$ selective absorber 5 is desorbed and transferred to the recycling fluid. The recycling fluid goes out through the outside air supplying member 7. Thus, the $CO_2$ selective absorber 5 is recycled by $CO_2$ desorption. At this time, the metal-air battery 2 can be charged by a charging member (not shown).

Then, for example, as shown in FIG. 10, the purified air shutoff mechanism 14 is opened, and the recycling fluid introducing mechanism 16 is closed, thus making it possible to carry out the discharging step again.

Keeping the outside air shutoff mechanism 12 of the outside air supplying member 7 closed and the recycling fluid introducing mechanism 16 of the recycling fluid supplying member 9 closed after discharging allows the metal-air battery system 24 to be pause (pause step).

Then, again, the outside air shutoff mechanism 12 is opened, thus making it possible to carry out the discharging step.

<Adsorption Test 1>

A $CO_2$ and $O_2$ adsorption test was carried out on amine-modified mesoporous silica powder, DDR-type zeolite powder, and X-type zeolite powder. After vacuum degassing at 120° C. for 8 hours, the amounts of $CO_2$ and $O_2$ adsorbed by the foregoing powders were measured. Test conditions and results were as follows.

Test Conditions:
  Temperature: 25° C.
  Pressure: 100 kPa
Adsorption Test Results:
Amine-Modified Mesoporous Silica
  $CO_2$: 1.67 mmol/g
  $O_2$: 0.40 mmol/g
DDR-Type Zeolite
  $CO_2$: 1.26 mmol/g
  $O_2$: 0.13 mmol/g
X-Type Zeolite
  $CO_2$: 1.98 mmol/g
  $O_2$: 0.37 mmol/g <Adsorption Test 2>

Then, the amounts of $CO_2$ adsorbed by amine-modified mesoporous silica powder, DDR-type zeolite powder, and X-type zeolite powder that had been exposed to air having a humidity of 10% for 24 hours were measured in the same manner as in adsorption test 1 except that vacuum degassing was not carried out before the adsorption amount measurement.

Test results were as follows:
Amine-Modified Mesoporous Silica
  $CO_2$: 1.06 mmol/g
DDR-Type Zeolite
  $CO_2$: 0.89 mmol/g
X-Type Zeolite
  $CO_2$: 0.07 mmol/g As the results of adsorption test 1 above show, $CO_2$ was selectively adsorbed over $O_2$. Therefore, when a mesoporous material or zeolite is used for the metal-air battery system of the present invention, air from which $CO_2$ has been removed can be specifically supplied to the cathode, and the operational performance of the metal-air battery system is enhanced. Also, it was found from the results of adsorption test 2 above that DDR-type zeolite, which has a larger Si/Al ratio than X-type zeolite, is less likely to be affected by water vapor contained in air.

1 Case
2 Metal-air battery
3, 3' Intermediate layers
4 Cathode
5 $CO_2$ selective absorber
6 $CO_2$ absorbing member
7 Outside air supplying member
8 Purified air supplying member
9 Recycling fluid supplying member
10 Recycling mechanism
12 Outside air shutoff mechanism
14 Purified air shutoff mechanism
16 Recycling fluid introducing mechanism

What is claimed is:

1. A metal-air battery system comprising:
   a metal-air battery including a case and a charge and discharge member arranged in said case and comprising a cathode, an anode and an electrolyte, said case having an air hole;
   a CO2 absorbing member having a CO2 selective absorber selectively absorbing CO2 over O2; an outside air supplying member supplying outside air to said CO2 absorbing member;
   a purified air supplying member supplying purified air to said cathode through said air hole of said case, the purified air having undergone absorptive CO2 removal by said CO2 selective absorber; and
   a recycling mechanism recycling said CO2 selective absorber.

2. The metal-air battery system of claim 1, wherein said outside air supplying member has an outside air shutoff mechanism cutting off contact said $CO_2$ selective absorber with said outside air upon neither discharging nor recycling of said $CO_2$ selective absorber.

3. The metal-air battery system of claim 2, wherein said purified air supplying member has a purified air shutoff mechanism cutting off contact said cathode with said purified air upon recycling of said $CO_2$ selective absorber.

4. The metal-air battery system of claim 2, wherein said $CO_2$ selective absorber contains at least one of a mesoporous material and a zeolite.

5. The metal-air battery system of claim 1, wherein said purified air supplying member has a purified air shutoff mechanism cutting off contact said cathode with said purified air upon recycling of said $CO_2$ selective absorber.

6. The metal-air battery system of claim 5, wherein said $CO_2$ selective absorber contains at least one of a mesoporous material and a zeolite.

7. The metal-air battery system of claim 1, wherein said $CO_2$ selective absorber contains at least one of a mesoporous material and a zeolite.

8. A method for operating a metal-air battery system according to claim 1, comprising:
   a discharging step of discharging electricity by supplying air to said cathode, the air having undergone absorptive $CO_2$ removal by said $CO_2$ selective absorber; and
   a recycling step of recycling said $CO_2$ selective absorber.

9. The method for operating a metal-air battery system of claim 8, further comprising a charging step of charging, wherein said recycling step is carried out during said charging step.

10. The method for operating a metal-air battery system of claim 9, comprising a pause step of cutting off contact said $CO_2$ selective absorber with outside air upon neither discharging electricity nor recycling of said $CO_2$ selective absorber.

11. The method for operating a metal-air battery system of claim 9, wherein said cathode does not contact with said purified air upon recycling of said $CO_2$ selective absorber in said recycling step.

12. The method for operating a metal-air battery system of claim 8, comprising a pause step of cutting off contact said $CO_2$ selective absorber with outside air upon neither discharging electricity nor recycling of said $CO_2$ selective absorber.

13. The method for operating a metal-air battery system of claim 12, wherein said cathode does not contact with said purified air upon recycling of said $CO_2$ selective absorber in said recycling step.

14. The method for operating a metal-air battery system of claim 8, wherein said cathode does not contact with said purified air upon recycling of said $CO_2$ selective absorber in said recycling step.

\* \* \* \* \*